United States Patent [19]
Negley, III

[11] Patent Number: 6,006,775
[45] Date of Patent: Dec. 28, 1999

[54] FUEL DISPENSING SYSTEM USING A COMMON METER AND OCTANE SENSING

[75] Inventor: Scott Robertson Negley, III, Salisbury, Md.

[73] Assignee: Dresser Industries, Inc., Dallas, Tex.

[21] Appl. No.: 09/256,881

[22] Filed: Feb. 24, 1999

Related U.S. Application Data

[63] Continuation of application No. 08/898,940, Jul. 23, 1997.

[51] Int. Cl.$^6$ .............................. G05D 11/00; G05D 7/00
[52] U.S. Cl. ...................... 137/93; 137/88; 137/101.19; 137/114
[58] Field of Search ................................ 137/487.5, 93, 137/88, 101.19, 114, 3

[56] References Cited

U.S. PATENT DOCUMENTS

| | | |
|---|---|---|
| 3,179,291 | 4/1965 | Umbach et al. . |
| 3,433,606 | 3/1969 | Moore et al. . |
| 3,731,777 | 5/1973 | Burke et al. . |
| 3,751,644 | 8/1973 | Mayer . |
| 3,864,095 | 2/1975 | Sinclair et al. . |
| 4,876,653 | 10/1989 | McSoadden et al. . |
| 5,029,100 | 7/1991 | Young et al. . |
| 5,139,045 | 8/1992 | Ensign . |
| 5,163,586 | 11/1992 | Zinsmeyer . |
| 5,257,720 | 11/1993 | Wulc et al. . |
| 5,275,189 | 1/1994 | Ensign . |
| 5,469,830 | 11/1995 | Gonzalez . |
| 5,630,528 | 5/1997 | Nanaji . |

Primary Examiner—Denise L. Ferensic
Assistant Examiner—Joanne Y. Kim
Attorney, Agent, or Firm—Haynes and Boone, LLP

[57] ABSTRACT

A system and method for dispensing a fuel derived from one or more fuels having different octane ratings respectively stored in a plurality of storage tanks. The fuels are passed from their respective tanks to a mixing zone for mixing to form a blended fuel. The blended fuel is passed from the mixing zone to a dispensing nozzle while the octane rating of the blended fuel is sensed. The flow of each fuel from its tanks to the mixing zone is controlled accordingly to establish and maintain a predetermined octane rating of the blended fuel.

6 Claims, 1 Drawing Sheet

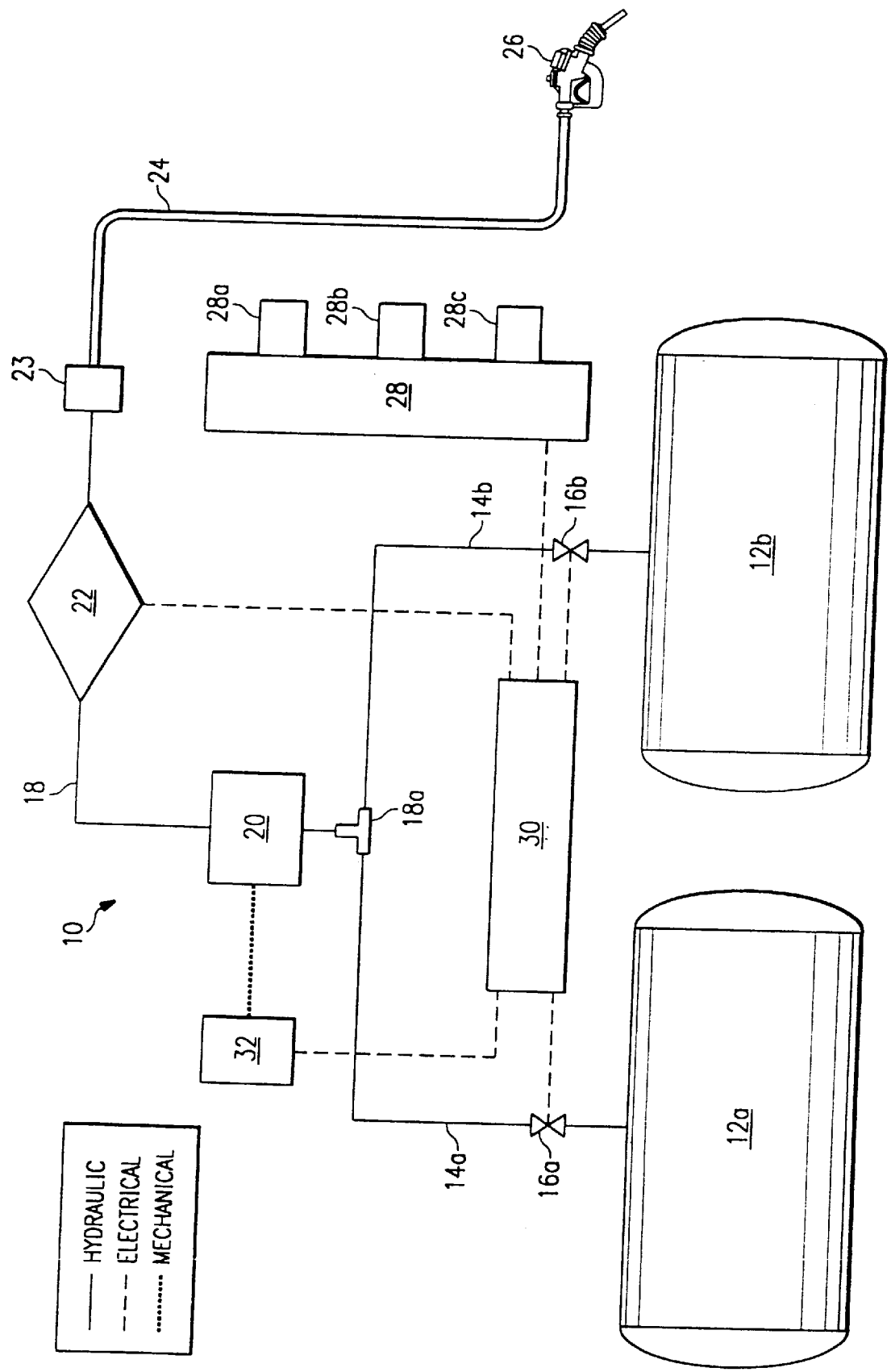

FUEL DISPENSING SYSTEM USING A COMMON METER AND OCTANE SENSING

This application is a continuation of Ser. No. 08/898,940 filed Jul. 23, 1997.

FIELD OF THE INVENTION

This invention relates to a fuel dispensing system and, more particularly, to such a system in which a blended fuel is dispensed which is derived from fuel products of different octane ratings, with the particular blend being dictated by an octane sensor.

BACKGROUND OF THE INVENTION

Many gasoline service stations require the installation of multi product fuel dispensers or pumps, each for dispensing a plurality of gasoline products having different octane ratings at each fueling station. Several known systems of this type typically include a separate flow path for each fuel product from its storage tank to the outlet nozzle which introduces it into the consumer's automobile. These systems therefore require the duplication of the components disposed between the tank and the nozzle for each fuel product, including the flow meter. U.S. Pat. No. 5,332,011, which is assigned to the assignee of the present invention, discloses such a dispenser in which three nozzles, fuel hoses and flow meters, each for a different grade of gasoline, are combined in a single dispenser.

There are many disadvantages in these discrete delivery systems. For example, the cost of the system is increased due to the requirement for multiple hoses, nozzles and flow meters. Also, the overall size and space requirements are increased due to the requirement to house the multiple components. In addition, the cost of maintenance and repairs is increased for each discrete delivery system, especially with respect to the flow meters.

In an effort to overcome some of the above problems, multi product fuel dispensers have been developed in which the supply lines from the respective storage tanks are manifolded into a single fuel hose downstream of the flow meters, which hose then leads to a single nozzle. Although this eliminates the multiplicity of nozzles and hoses, the problems associated with the multiplicity of flow meters, such as complexity, space limitations, and repair and maintenance expenses, remain.

Although there have been some designs that have reduced costs by utilizing a single flow meter for a multiple of fuels, they lead to still other problems. For example, in these arrangements a blended fuel is obtained by combining a relatively high octane fuel product with a relatively low octane product, with the desired octane blend ratio being achieved by controlling the flow through a proportional flow control valve associated with each fuel product. However this can lead to significant inaccuracies in the octane of the blended product since the latter is dependent on the actual octane rating of the fuel products in the storage tanks which can vary significantly. Therefore, regardless of the precision of the dispenser blending system in these arrangements, the octane of the blended product delivered through the hose is only as accurate as the purported grade rating of the fuel products in the storage tanks.

Therefore what is needed is a multi product fuel dispensing system in which a blended fuel is derived from a plurality of fuel products with different octane ratings, with the octane content of the blended fuel being independent of any variations in the octane rating of the individual fuel products. What is also needed is a system of the above type which can produce a blended octane fuel that is extremely accurate with respect to its octane rating.

SUMMARY OF THE INVENTION

According to the dispensing system and method of the present invention, fuels having a different octane rating are passed from their respective storage tanks to a mixing zone for mixing, and the mixed, or blended, fuel is passed from the mixing zone to a dispensing nozzle. A sensor is provided for sensing the octane rating of the blended fuel, and the flows of the fuels from the respective tanks to the mixing zone are controlled accordingly to establish and maintain a predetermined octane rating of the blended fuel.

As a result of the above, the octane rating of the blended fuel is independent of any variations in the octane rating of the individual fuel products. Also, a blended octane fuel can be produced that is extremely accurate with respect to its octane rating. Further, the complexity, space limitations, original cost and maintenance expenses are all relatively low.

BRIEF DESCRIPTION OF THE DRAWINGS

The drawing is a schematic view of the dispensing system of the present invention with the hydraulic connections being shown by solid lines, the electrical connections being shown by dashed lines, and with a mechanical connection being shown by a dotted line.

DESCRIPTION OF THE PREFERRED EMBODIMENT

Referring to the drawing, a multi product fuel dispensing system of the present invention is shown schematically and generally referred to by the reference numeral 10. The dispensing system 10 receives fuel from two storage tanks 12a and 12b, which respectively store fuel products with a relatively high and a relatively low octane rating. Two fuel delivery lines, or conduits, 14a and 14b, pass the fuel products from the storage tanks 12a and 12b, with the respective ends of the lines 14a and 14b being connected to an end of a single fuel delivery line, or conduit, 18 at a "tee" connection 18a defining a mixing zone. A pump (not shown) is associated with each flow line 14a and 14b for pumping the fuel products from the tanks 12a and 12b through the respective flow lines, and the flows through the lines are controlled by two flow control valves 16a and 16b, respectively. Preferably, the valves 16a and 16b are operated in a manner so that only the fuel product from the storage tank 12a flows to the line 18, so that only the fuel product from the storage tank 12b flows to the line 18, or so that the fuel products from both tanks flow to the tee connection 18a and are mixed, or blended, together before the blended fuel flows to the line 18.

A flow meter 20 is disposed in the flow line 18 downstream of the tee connection 18a, and an octane sensor 22 is also disposed in the flow line downstream of the flow meter. The sensor 22 preferably includes a silicon microstructure sensor system proprietary to the Honeywell Corporation, and since it is conventional and, per se, does not form a part of the present invention, it will not be described in any further detail.

The flow line 18 terminates at an outlet casting 23 to which one end of a flexible hose 24 is connected. Thus, the fuel flows from the sensor 22, through the line 18, and through a bore in the casting 23 to the hose 24 under conditions to be described. A dispensing nozzle 26 extends from the other end of the hose 24, is conventionally designed for insertion into a customer's vehicle fuel tank (not shown), and has a manually operated valve to control the flow of the fuel into the vehicle. A product selection panel 28 has three buttons 28*a*, 28*b* and 28*c* corresponding to the grades of fuel available and functions in a manner to be described to allow the customer to select the desired grade of fuel to be dispensed.

A control unit 30 has input terminals electrically connected to the octane sensor 22, to the selection panel 28, and to a pulser 32, which, in turn, is mechanically connected to the flow meter 20. The control unit 30 receives input signals from the octane sensor 22 corresponding to the octane rating of the fuel flowing through the line 18, as well as signals corresponding to the particular octane rated fuel selected by the customer at the panel 28. The pulser 32 is conventional and converts the mechanical, or analog, signals from the flow meter to electrical signals for the control unit 30 that correspond to the flow rate of the fuel through the line 18.

The control valves 16*a* and 16*b* are electrically connected to two output terminals of the control unit 30 so that output signals generated by the control unit can control the operation of the valves and therefore the respective flows of the fuel from the storage tanks 12*a* and 12*b* to the line 18 and to the nozzle 26. It is understood that the control unit 30 includes a microprocessor, or the like, that receives the above mentioned input signals and generates the corresponding output signals in accordance with a predetermined software program.

In operation, the customer selects a desired octane rated fuel from the product selection panel 28 by pressing the appropriate button 28*a*–28*c* and turning on a master system switch. This selection is electronically transferred from the product selection panel 28 to the control unit 30 which responds and sends corresponding signals to one or both of the flow control valves 16*a* and 16*b*, depending on the particular octane rating that is selected. The valves 16*a* and 16*b* are normally closed but are opened in response to the signals received from the control unit 30, with the degree of opening being varied under conditions to be described.

If a fuel having an octane rating corresponding to the fuel product stored in one of the storage tanks 12*a* or 12*b* is selected, the appropriate control valve 16*a* or 16*b* is opened. Upon the customer activating the nozzle 26, fuel flows from the corresponding storage tank 12*a* or 12*b* and passes through its associated fuel delivery line 14*a* or 14*b*, through the tee connection 18*a* into the fuel delivery line 18, and through the fuel meter 20. The fuel meter 20 tracks the amount of fuel flowing through the line and sends corresponding signals to the control unit 30 via the pulser 32, which, in turn, controls the degree of opening of the corresponding control valve 16*a* of 16*b* to enable a specific desired fuel flow rate through the line 18 to be achieved. When the customer's fuel tank is full, or at anytime that the customer desires to stop the fuel delivery by deactivating the nozzle 26 and tripping the above-mentioned master system switch, the activated flow control valve 16*a* or 16*b* closes to stop the flow of fuel from the selected storage tank 12*a* and 12*b*.

If the fuel selected by the customer has an octane rating between that of the respective fuel products stored in the tanks 12*a* and 12*b*, both control valves 16*a* or 16*b* are opened in the above manner, with the degree of opening of each being controlled by the control unit 30 depending on the particular blend selected. Upon the customer activating the nozzle 26, the fuel products flow from the corresponding storage tanks 12*a* and 12*b*, through the corresponding fuel delivery lines 14*a* and 14*b*, and to the tee connection 18*a* where they are blended before passing into the fuel delivery line 18. The fuel meter 20 functions in the same manner as described above and the octane sensor 22 senses the precise octane rating of the blended fuel in the line 18 and sends corresponding signals to the control unit 30. In this manner the control unit 30 can continuously respond to the signals received from the sensor 22 and control the degree of opening of each of the control valves 16*a* and 16*b* accordingly to insure that the octane rating of the fuel flowing through the line 18 and to the nozzle 26 corresponds to the octane rating of the fuel selected by the customer.

It can be appreciated that the system 10 can be designed so that multiple blended fuels can be dispensed in the foregoing manner by simply adding additional buttons on the selection panel 28, thus giving the customer a large selection of fuels with different octane ratings between the ratings of the fuel products stored in the tanks 12*a* and 12*b*.

Also, if the customer selects the relatively high octane-rated fuel product stored in one of the tanks 12*a* or 12*b*, but the actual octane rating of the fuel product is higher than its rated value, the system 10 will respond accordingly and dilute the octane rating of the fuel by blending it with the relatively low octane-rated fuel product in the other tank. Similarly, if the relatively low octane-rated fuel product stored in one of the tanks 12*a* or 12*b* is selected but its actual octane rating is lower than its rated value, the system 10 will respond accordingly and increase its octane rating by blending it with the relatively high octane-rated fuel product in the other tank.

Thus, according to the system and method of the present invention the octane rating of the blended fuel is independent of any variations in the octane rating of the individual fuel products. Also, a blended octane fuel can be produced that is extremely accurate with respect to its octane rating. Further, the system 10 also provides several additional benefits and technical advantages. For example, by employing a single common fuel meter 20, both the original costs, and the expected repair and maintenance costs, of the dispensing system 10 are reduced due to the elimination of relatively expensive and high maintenance component parts, such as multiple fuel meters. Moreover, as parts have been eliminated, the overall size and space requirements of the dispensing system 10 are reduced.

Another advantage of the present invention is that, upon the stoppage of fuel delivery, the selected fuel delivery lines 14a and 14b, the flow control valve 16a and 16b, the fuel meter 20, the fuel delivery line 18, the hose 24 and the nozzle 26 all remain full of fuel which is equal to or less than 0.3 gallons of fuel due to the reduced internal volume of the single fuel meter 20. In this manner, even if a customer selects a different grade of fuel than the previous customer, only a slight commingling of fuels will occur. Thus, the dispensing system 10 can pass the United States National Conference on Weights and Measures testing and certification procedures for octane certification as the remaining fuel ($\leq 0.3$ gallons) will be flushed from the dispensing system before the test sample is collected.

Several variations can be made in the above embodiment without departing from the scope of the invention. For example, the relatively low octane fuel product can be delivered at all times and the relatively high fuel product can be selectively added to the low octane product at the tee connection to establish and maintain a predetermined octane rating in the blended fuel.

According to an alternative embodiment of the present invention, a fuel is stored in one of the storage tanks 12a or 12b and an additive stored in the other. The additive is of a conventional type that is designed to mix with fuel to raise the octane level of the fuel. According to the present invention, the additive and the fuel are selectively mixed to establish and maintain a predetermined octane rating of the fuel in the same manner as described above.

It is understood that in both of the above-disclosed embodiments, standard components such as pumps, and the like, which are normally used in installations of this type can be employed as needed. Also, the expressions "flow line" and "conduit" are used interchangeably, it being understood that any type of fluid flow apparatus can be used to pass the fuels in the manner described above. It also should be emphasized that since FIG. 2 is merely a schematic representation of the basic components of the assembly of the present invention, the exact location, size and lengths of the components can vary within the scope of the invention.

It is understood that the dispensing system 10 can be designed to contain two fueling stations on opposing sides to service two customers at a time, each having a fuel delivery system as just described for dispensing fuel from the storage tanks 12a and 12b. As such fueling stations are identical, only one station has been described.

Several other variations can be made in the foregoing without departing from the scope of the present invention. For example, the above-described valves can be eliminated and the control of the fuel products from their respective tanks can be achieved by other means, such as for example, controlling the output of the pumps that pump the fuels from their tanks. Also, the present invention is not limited to a multi-fuel installation, but is equally adaptable to a single fuel system in which the flow of the fuel from the tank is controlled in response to the octane rating of the fuel. In addition, the tee connection 18a can be replaced by a manifold or any other type of device that would permit the fuel mixing described above. Further, more than two fuel tanks can be provided that contain fuels of varying octane ratings. Still further, although the dispensing system 10 has been described as having a single hose 24 and a single nozzle 26, the fuel delivery line 18 could be replaced with a plurality of fuel delivery lines, one for each product to be dispensed from the dispensing system, for receiving fuel from the common fuel meter 20. Each such fuel delivery line would be attached to a separate hose and nozzle. In such a system, additional flow control valves would be required downstream of the flow meter 20, in addition to the flow control valves 16a and 16b, to control the flow of fuel through the dispensing system.

Further modifications, changes and substitutions are intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. A method for blending at least two fuels having different octane ratings into a blended fuel having a predetermined octane rating, the method comprising the steps of:

provided a first storage tank containing a first fuel having a relative low octane rating;

providing a second storage tank containing a second fuel having a relative high octane rating;

providing first and second conduits respectively extending from the first and second storage tanks;

providing a blending chamber connected to the first and second conduits;

providing a third conduit extending from the blending chamber to an outlet;

flowing the first fuel from the first storage tank, through the first conduit and into the blending chamber;

flowing the second fuel from the second storage tank, through the second conduit and into the blending chamber for blending with the first fuel;

flowing the blended fuel from the blending chamber to the third conduit for passage to the outlet, measuring the octane rating of the blended fuel during the last step of flowing; and responding to the measured octane rating of the blended fuel being different from the predetermined octane rating and increasing or decreasing the octane rating of the blended fuel by changing the flow of either one of the fuels into the blending chamber accordingly until the measured octane rating of the blended fuel corresponds to the predetermined octane rating.

2. The method of claim 1 further comprising the steps of connecting one end of each of the first and second conduits to its corresponding storage tank and connecting the other end of each of the first and second conduits to the blending chamber.

3. The method of claim 1 further comprising the steps of connecting one end of the third conduit to the blending chamber and connecting the other end of the third conduit to a dispensing nozzle.

4. A system for blending at least two fuels having different octane ratings into a blended fuel having a predetermined octane rating, the system comprising:

a first storage tank containing a first fuel having a relative low octane rating;

a second storage tank containing a second fuel having a relative high octane rating;

first and second conduits respectively extending from the first and second storage tanks;

a blending chamber connected to the first and second conduits;

a third conduit extending from the blending chamber to an outlet;

means for flowing the first fuel from the first storage tank, through the first conduit and into the blending chamber, means for flowing the second fuel from the second storage tank, through the second conduit and into the blending chamber for blending with the first fuel;

means for flowing the blended fuel from the blending chamber to the third conduit for passage to the outlet, means for varying the flow of the first fuel through the first conduit;

means for varying the flow of the second fuel through the second conduit;

a sensor for measuring the octane rating of the blended fuel flowing through the third conduit; and a control unit electrically connected to the sensor and to the flow measuring means for receiving an input signal corresponding to the measured octane rating of the blended fuel, responding to the measured octane rating of the blended fuel being different from the predetermined octane rating, and providing an output signal to either one of the flow varying means for changing the flow of its corresponding fuel into the blending chamber accordingly to increase or decrease the octane rating of the blended fuel accordingly until the measured octane rating of the blended fuel corresponds to the predetermined octane rating.

5. The system of claim 4 wherein one end of each of the first and second conduits is connected to its corresponding storage tank and the other end of each of the first and second conduits is connected to the blending chamber.

6. The system of claim 4 wherein one end of the third conduit is connected to the blending chamber and the other end of the third conduit is connected to a dispensing nozzle.

* * * * *